United States Patent [19]

Carruth, Jr.

[11] 4,369,505
[45] Jan. 18, 1983

[54] METHOD AND APPARATUS ASSOCIATED WITH A MICROCOMPUTER SYSTEM FOR AUTOMATICALLY TESTING A NEXT-IN-TIME POSITIONAL PARAMETER OF AN EXPLORATION SYSTEM THAT INCLUDES TWO RECORDING TRUCKS

[75] Inventor: H. T. Carruth, Jr., Anaheim, Calif.

[73] Assignee: Chevron Research Company, San Francisco, Calif.

[21] Appl. No.: 169,335

[22] Filed: Jul. 16, 1980

[51] Int. Cl.³ .............................................. G01V 1/24
[52] U.S. Cl. .................................... 367/13; 367/14; 367/37; 367/60; 367/76
[58] Field of Search ................. 367/14, 37, 55, 56, 367/60, 63, 71, 74, 76–80; 346/336, 421, 900, 200

[56] References Cited

U.S. PATENT DOCUMENTS

| | | | |
|---|---|---|---|
| 4,202,048 | 5/1980 | Edwards et al. | 367/60 |
| 4,214,128 | 7/1980 | Bovee et al. | 367/60 |
| 4,257,098 | 3/1981 | Lacy | 371/33 |
| 4,280,201 | 7/1981 | Mart et al. | 367/56 |
| 4,285,052 | 8/1981 | Bobbitt | 367/56 |

Primary Examiner—Howard A. Birmiel
Attorney, Agent, or Firm—Edward J. Keeling; H. D. Messner

[57] ABSTRACT

The present invention relates to testing—at a second recording truck—a positional reference code (generated by a first recording truck); the reference code (associated with next-in-time positions of a source-detector array operatively connected to the second truck) is interrogated using a microcomputer system of a ground positional controller housed in the second truck. Result: coordination of operations (between trucks) is assured.

9 Claims, 6 Drawing Figures

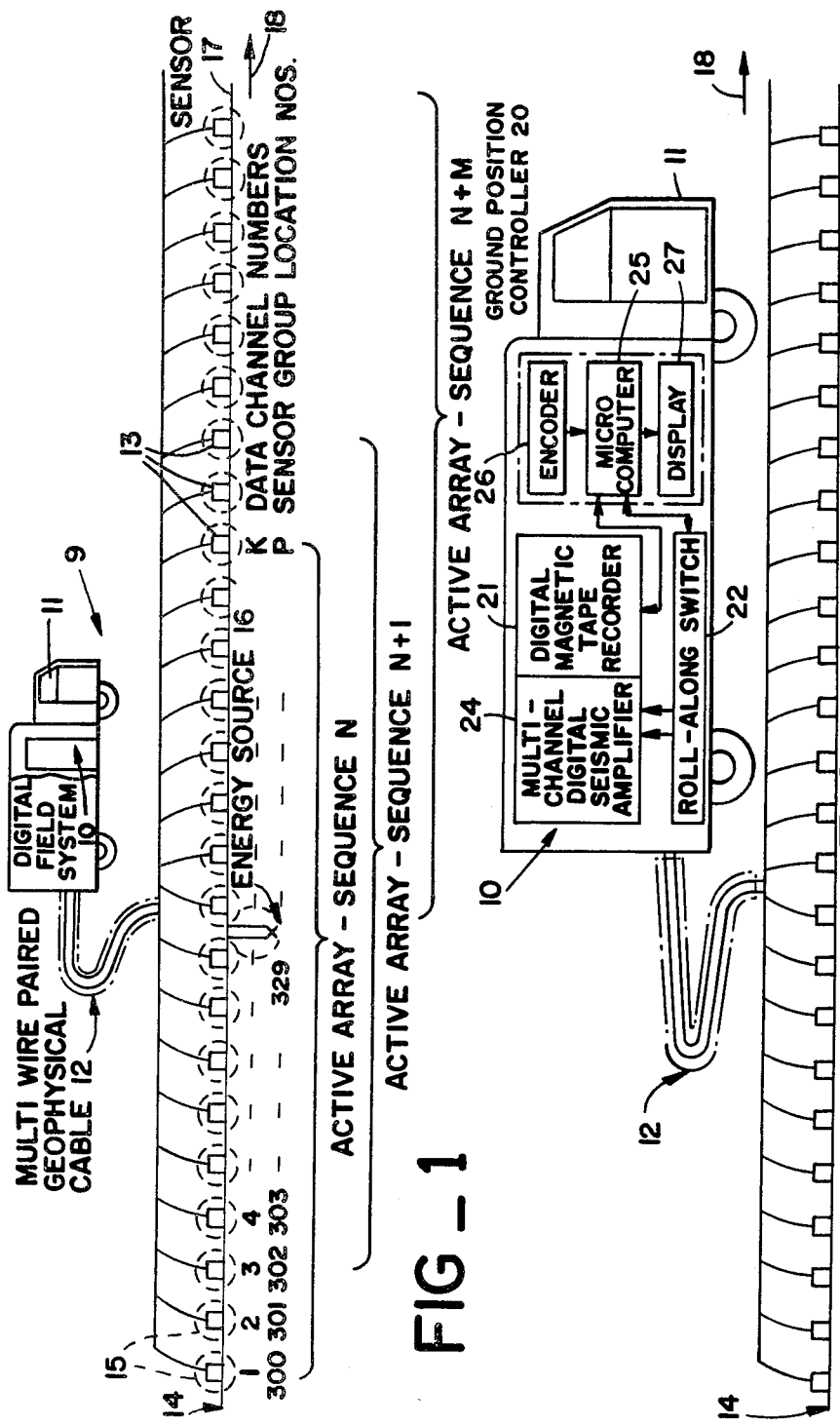

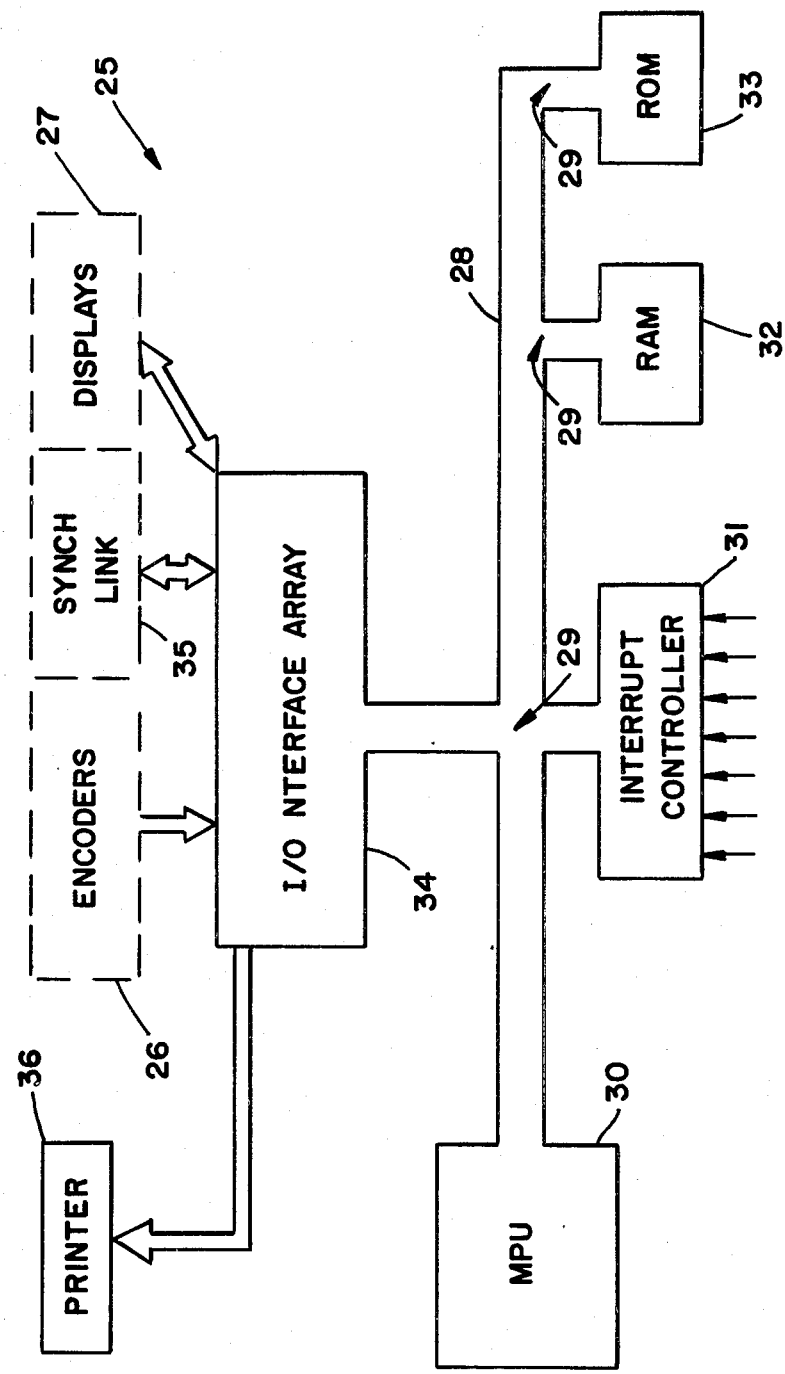
FIG_3

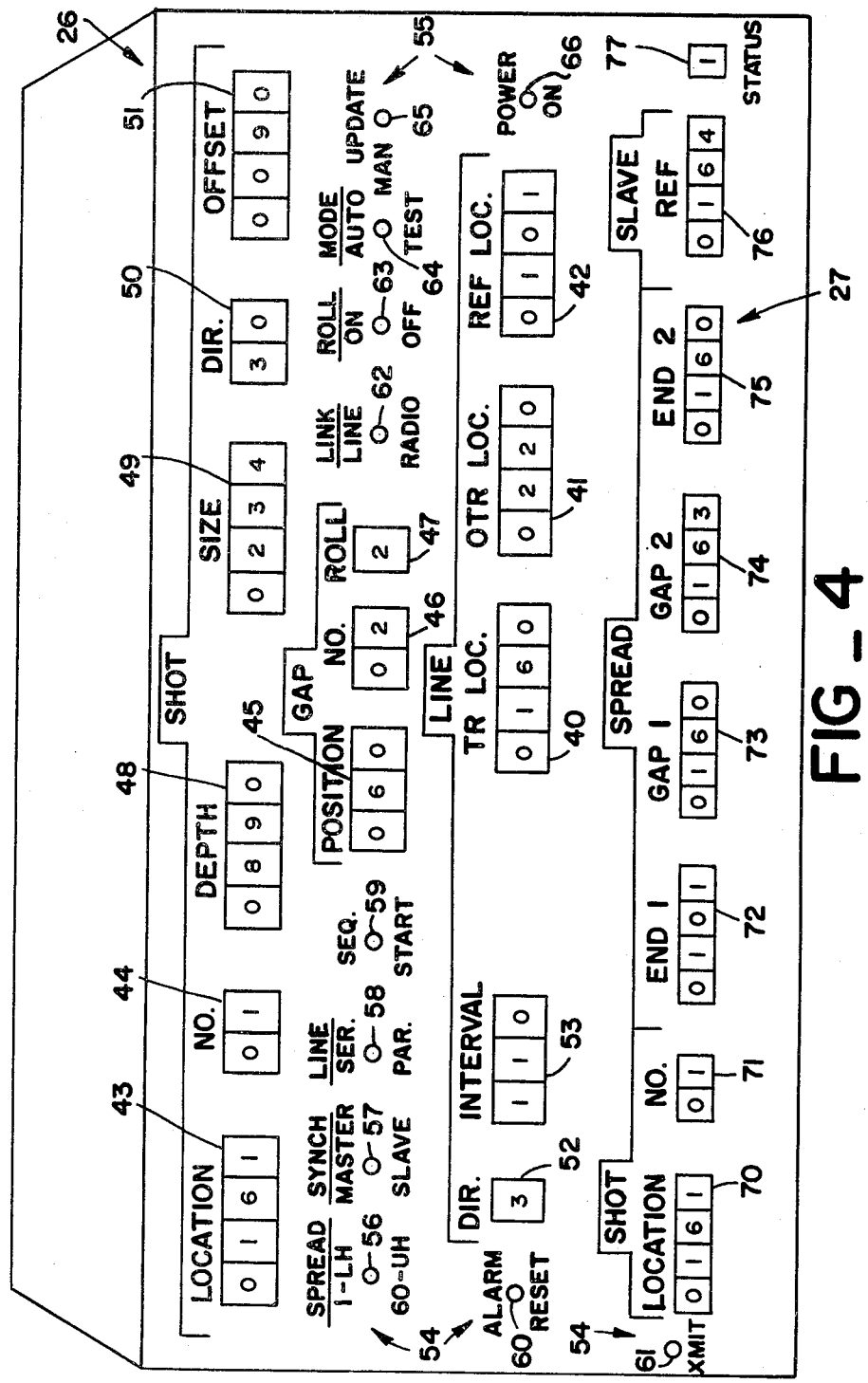
FIG_4

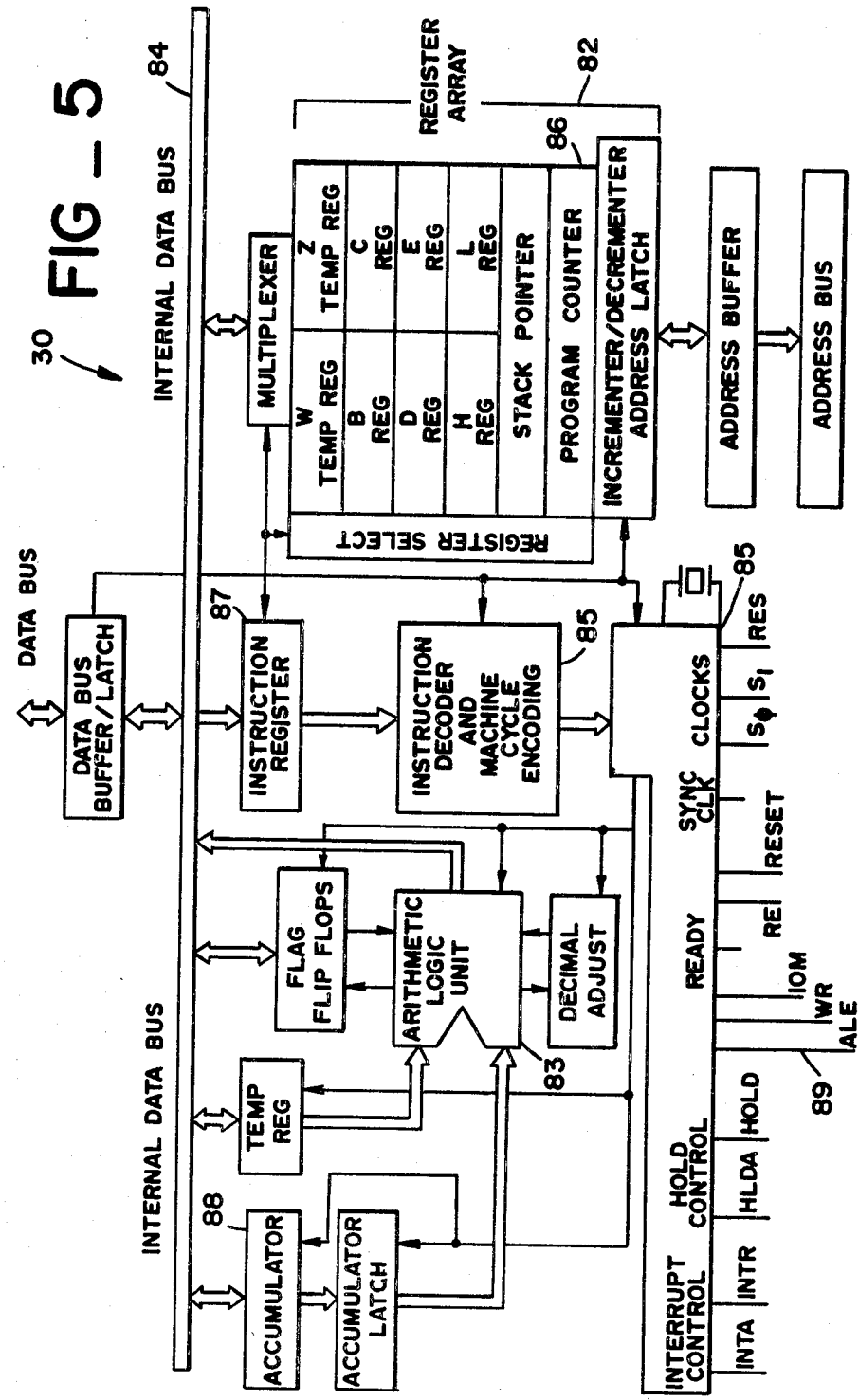

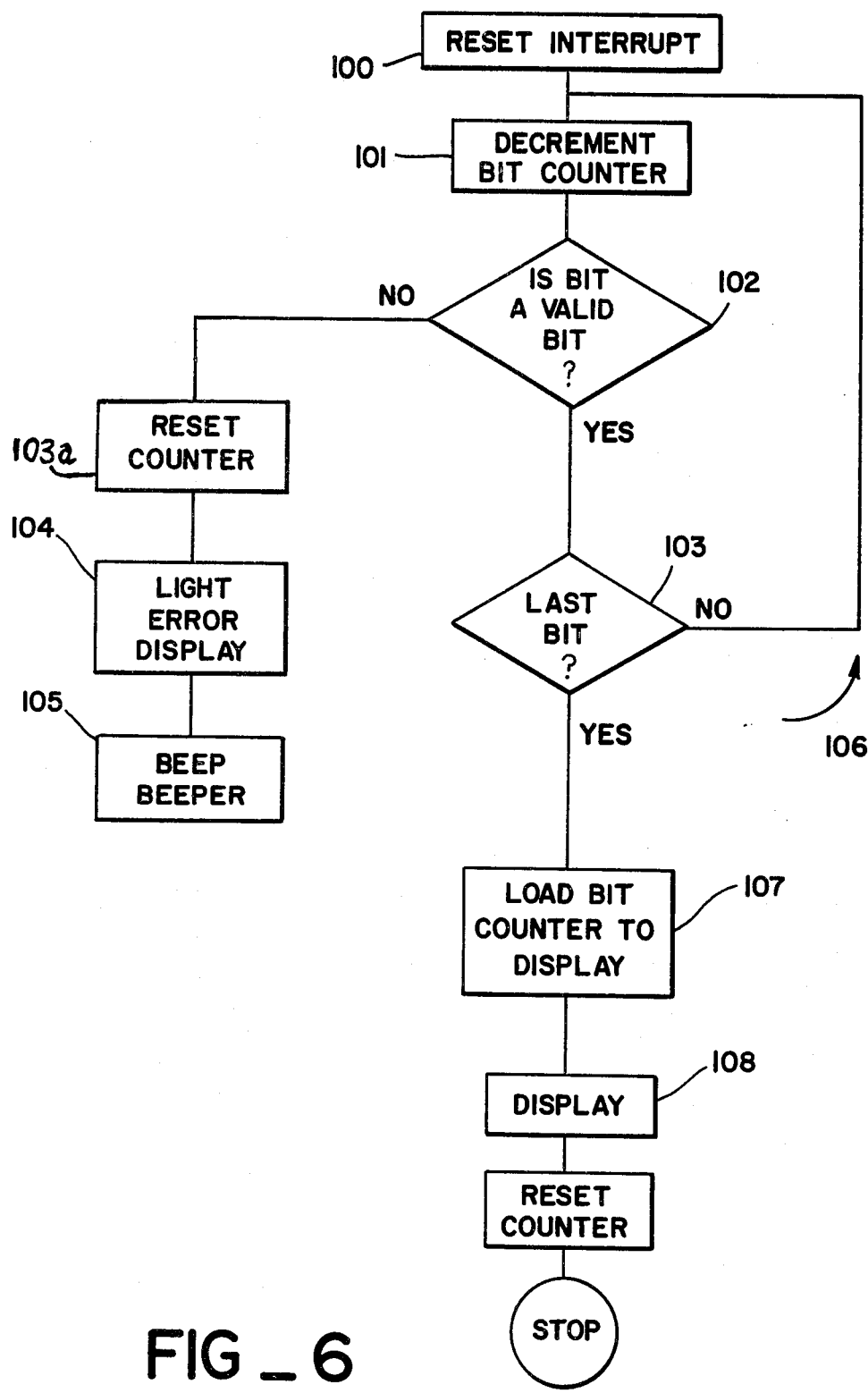
FIG_6

METHOD AND APPARATUS ASSOCIATED WITH A MICROCOMPUTER SYSTEM FOR AUTOMATICALLY TESTING A NEXT-IN-TIME POSITIONAL PARAMETER OF AN EXPLORATION SYSTEM THAT INCLUDES TWO RECORDING TRUCKS

FIELD OF THE INVENTION

This invention relates to an improved method and apparatus for providing control of field shooting and recording operations during exploration for hydrocarbons, or the like.

RELATED APPLICATIONS

My following commonly assigned application is incorporated herein by reference:

Ser. No. 169,336, filed July 16, 1980, for "Ground Position Controller and Method for Automatically Indicating and Recording Parameters that Spatially Define Locations of Seismic Exploration Spread and Source Arrays".

Also, there is an additional commonly assigned application in the area of seismic exploration of interest:

Ser. No. 169,345, filed July 16, 1980, for "Ground Position Controller and Method for Automatically Indicating Parameters that Spatially Cross-Reference the Locations of Seismic Spread and Source Arrays During Exploration for Hydrocarbons and the Like".

BACKGROUND OF THE INVENTION

While the above-identified ground position controller and method of my related applications provide for automatic generating, formatting, displaying and recording of seismic information (including sensor and source array geographic locations), additional annotational problems remain. E.g., where two trucks are used in association with two ground position controllers, there must be a modification to the receiving sequence to assure coordination of operations between the source-detector array of the master truck and that of the slave truck.

SUMMARY OF THE INVENTION

The present invention relates to a method and apparatus for testing a positional reference code (generated by a first recording truck) but tested at a second recording truck, the reference code being associated with next-in-time positions of a source-detector array operatively connected to the second truck. Result: coordination of operations between the trucks is enhanced. The reference code generated at the first truck as bits of digital data, is tested using a microcomputer system within a ground positional controller housed in the second truck. After a multi-bit counter has been decremented and the received code tested at the second truck, the code can be displayed for operator examination. The displayed data can be thus used to cross-check positional parameters generated by and displayed at the microcomputer system in the second truck or be used to initiate operations at the latter truck, automatically. In either event, coordination of operations (between trucks) is assured.

DESCRIPTION OF THE DRAWINGS

These and other functions of the present invention will become evident to those skilled in the art from a reading of a detailed description of embodiments thereof, following a brief description of the appended drawings.

FIGS. 1 and 2 illustrate an exploration system incorporating the present invention in which a source of energy and an array of sensors connected to a recording truck, are illustrated.

FIGS. 3, 4 and 5 are diagrams of certain aspects of a microcomputer system of the present invention used within the exploration system of FIGS. 1 and 2.

FIG. 6 is a flow diagram which illustrates the method of the present invention.

DESCRIPTION OF PREFERRED EMBODIMENTS OF THE INVENTION

FIG. 1 illustrates operation of seismic exploration system 9 of the present invention.

As shown, system 9 includes digital field system 10 and 10' housed within recording trucks 11 and 11', respectively. The systems 10 and 10' are electrically interconnected via multi-wire geophysical cables 12 and 12' to arrays of sensors 13 and 13' positioned at the earth's surface 14. Ground locations 15 are represented as surrounding both the arrays of sensors 13 and 13' and seismic energy sources 16 and 16', all positioned along the surface 14. As previously mentioned in the CDPR collection process, the ground locations 15 would, more likely than not, have been previously surveyed prior to implementation of the seismic surveying operation along the line of survey 17 in the direction of arrow 18. Hence, each of the locations 15 can be designated by a particular position number (or P number) along the line 17. The P numbers set forth in FIG. 1 include the numbers 300, 301 . . . 329. Also, the number of sensors 13 forming each array (as the data is collected) is identified by the sequence numbers N, N+1 . . . N+M designating the length of the active array as the sensors 13 are advanced in the direction of arrow 18.

Annotating the positions of the sensor arrays is aided by the fact that each sensor of each array 13 and 13' is associated with a particular data channel 1, 2 . . . K of the DFS 10 and 10' as the data is collected. For usual operations K can be 24, 48, 60, 96, 120, etc., as required, although, of course, the present invention is not limited to a particular channel capacity number, but can be varied to accommodate any field arrangement. Each sensor position and each source location associated with sensors 13 and 13' and sources 16 and 16' can be indicated using ground position controllers 20 and 20' of the present invention coordinated in operation as noted below.

FIG. 2 illustrates ground position controller 20 in more detail. Since controllers 20 and 20' are the same structurally, descriptions of one explain operations of the other, except in those instances noted below. The notable difference in operation relates to the fact that controller 20 is housed within the master truck 11 and hence, to some extent, controls operations of the controller 20' in the slave truck 11'.

Briefly, the ground position recorder 20 operates in the field to insure integrity between prescribed and actual field shooting and recording operations by a series of steps, namely, storing, manipulating displaying generating and testing synchronization data related (i) to field positions of the sources and sensor arrays by position number, (ii) to array and source geometrical locations (both present and next-in-time) based on field geometrical algorithms and (iii) to recording array and source parameters so that realistic annotation of the subsequently collected seismic data can be made. For these purposes, the operator utilizes encoded data provided initially by him using encoders 26, manipulated results generated by the controller 20 based on part in stored relationships within the microcomputer 25 indicating geometrical data set forth at displays 27 and finally synchronizing operations between the trucks 11 and 11', as discussed below.

Since the present invention deals conveniently with the CDPR process, the arrays of sensors and sources of energy are continually "rolled forward" in the direction of arrow 18 using rollalong switches. That is to say, after the seismic data has been recorded at the digital tape recording unit 21 (after amplification by amplifier 24), the array of sensors 13 (and source 16) along with sensor 13' and source 16', are all "rolled forward" in the direction of arrow 18. Note that the array and source geometry are always known at the recording trucks 11 and 11' provided the positional locations of FIG. 1 for the particular active array are correctly identified and recorded during each recording cycle, via operation of the ground position controller 20 and 20' of the present invention; of particular importance is the manipulation of data associated with the field geometry of the sensors 13 and 13' and source 16 and 16' via geometrical and performance algorithms stored within microcomputers of each controller 20 and 20'.

Microcomputer 25 of controller 20 is used in the master truck to predict correct array positions as the rollalong switch 23 switches between "active" and "inactive" sensors of its source-sensor array, as well as control operations within the slave truck 11' (FIG. 1). The microcomputer 25 can also interact with the rollalong switch 22, provided the latter is capable of accepting the multi-bit codes conventionally generated by the microcomputer 25. (In this regard, an approved rollalong switch is manufactured under the tradename "Rola-long Switch", by Input-Output, Inc., Houston, Tex., and consists of a series of contacts attached to a central shaft of a stepping motor controlled via a digital input code from the microcomputer 25.)

Rollalong switch 22 usually includes a display (not shown) associated with one or two of the locational positions of the active array of sensors 13. Such display, of course, changes as the active array changes sequential pattern in the manner shown in FIG. 1. The rollalong switch 22 also includes a digital generator (not shown) for generating a second multi-bit code indicative of the position of a member of the sensor array as header indicia at the recorder 21. However, as previously mentioned, the latter digital code represents only an arbitrary number and is not a true geodytic location.

FIG. 3 illustrates microcomputer 25 of controller 20 in still more detail.

As shown, the microcomputer 25 include a system bus 28 used to connect encoders 26, displays 27 and synchronization link circuit 35 via I/O interfacing array 34 to microprocessor unit 30 (MPU) of the microcomputer 25. Also connected via the bus 28 and ports 29 are interrupt controller 31, RAM 32, ROM 33 (in addition to I/O interfacing array 34), which operates in conventional fashion to calculate, manipulate, store and coordinate operations with the exploration sequence. Note that the I/O array 34 not only links the MPU 30 with the encoders 26 and displays 27, but it is also used to provide data to the printer 36 as well as coordinate transfer of data between the trucks 11 and 11' (FIG. 1) via the synchronization link circuit 35, as explained below.

Bus 28 essentially comprises three separate buses, a data bus, an address bus and a control bus. The data bus is conventional: it not only carried information to and from MPU 30, but it is also used to fetch instructions that have been stored in ROM 33, as required, as well as carries data from/to the encoders 26 and displays 27 of FIG. 2, by way of (or independent of) RAM 32.

Addressing segments of the data is the annotations function of the address bus. It is capable of selecting a location in RAM 32 or ROM 33 or a particular address in the MPU 30 when appropriately signaled, say by interrupt controller 31.

Additionally, it should be noted, that in the present invention, interrupt controller 31 handles seven (7) vectored priority interrupts for the MPU 30, as explained below, including an end-of-record interrupt (EOR) generated by the digital field system 10 (or 10') of FIG. 1, to indicate the end of the collection cycle, and to initiate operations in the next-in-time cycle.

In general, in servicing the interrupts, preservation of program status is required and is easily carried by the MPU 30. Since the controller 31 is both vectored and priority oriented, it has the responsibility of providing vectored interrupts to the MPU 30, of identifying the nature of the interrupt, (or its branching address) and of establishing priority between competing interrupts. In particular in servicing the EOR interrupt, the steps set forth in FIGS. 9B and 9D are executed to bring about automatic updating of the array and source geometry to achieve the next-in-time collection of data, based in part on the field algorithms contained in equation sets I, II, III or IV set forth below.

FIG. 4 illustrates the nature of the data provided at encoders 26 and displays 27.

The operator initially calibrates positions of the exploration array and source with previously surveyed geographical stations. Information has been already encoded via the encoders 26 for use by microcomputer 25 before operations begin. Encoded data at encoders 26 includes:

(i) truck location (vis-a-vis survey stations of known geographic location) encoded at encoder subelement 40;

(ii) slave truck location encoded using encoder subelement 41;

(iii) reference station location (where the end of the spread is initially positioned) encoded via encoding subelement 42;

(iv) initial location of the energy source encoded using encoder subelement 43;

(v) the number of shots or sweeps encoded at subelement 44;

(vi) the initial gap position, stored at subelement 45;

(vii) the gap spacing encoded using encoder subelement 46; and (viii) gap roll increment encoded using subelement 47.

The operator also has the initial responsibility of encoding other data which, for the most part, does not change during the survey. In this regard, the operator may have to only initially encode shot depth and size (at subelements 48 and 49), shot direction and offset (at subelements 50 and 51) as well as data related to the spread, as to its direction (at subelement 52) and the distance between groups (at subelement 53).

Switch arrays generally indicated at 54 and 55 are also set by the operator. Data provided by these switch arrays, relate to two or three possible switch states of the switches 56-66 which are, for example, related to the type of survey and run conditions occurring after the survey is underway.

[In this regard, the functions of the switches are as follows: Switch 56 specifies line direction; switch 57 specifies truck rank, i.e. determines if the reference truck is the master (or slave) in relationship with the alternate truck; switch 58 specifies operations in either a serial or in a parallel mode, the mode being related to whether one or two arrays of geophones are used in-line or parallel to the corresponding source line; pushbutton switches 59 and 60 relate to start up and to alarm reset functions respectively; switch 59, of course, initializes operations after all synchronization has been completed; switch 60 turns off the audio alarm in the event that a signal of some importance has been generated causing the alarm to also activate; transmit switch 61 "triggers" the energy source, and is operative only after the operator is assured the correctness of the array and source positions as displayed at displays 27; switches 62 and 63 related to (i) the "trigger" link associated with the activation of the source (electrical wire-line or radio) and (ii) whether or not the roll switch 22 (FIG. 2) is to be in an active or passive state. Three-position switch 64 establishes whether or not the operation is to be in a manual, automatic or test mode; update switch 65 operates only when the switch 64 is in the manual mode and is used (in manual mode) to initiate advances of the roll switch so as to generate new ground locations for the array after the recording cycle has been completed; and switch 66 is a conventional power-on switch.]

Displays 27 may be conventional LED segmented displays except that they are microcomputer implemented. Primary purposes of the displays 27: to provide data to the operator so that determinations as to whether or not the system is functioning correctly can be made, and to allow the operator to act as an independent cross-checker of the correctness of the displayed ground locations. The data at displays 27 relate for the most part to the type of run being undertaken and survey conditions.

[In this regard, the nature of the displays 27 is as follows: subdisplays 70 and 71 indicate shot location and number of shots per location, respectively; subdisplays 72-75 relate to geographic locations of the active array as a function of time; subdisplay 76 specifies the position of the slave reference; status subdisplay 77 specifies (by code) the occurrence of certain activities during the exploration operation which may be accompanied by an audio alarm to indicate the immediate need for operator intervention, the meaning of the status code at subdisplay 77 being as set forth below, in Table I.

TABLE I

| Code | Activity |
| --- | --- |
| 0 | Setup for sequence start operation |
| 1 | Geometrical mistie |
| 2 | Ready for update or update in progress (if in auto mode) |
| 3 | Roll Switch Moving |
| 4 | Roll Switch (Stopped in position) |
| 5 | Roll Switch Disabled |
| 6 | Slave Reference Code Received |
| 7 | Transmission Reference Error (slave reference code not received) |
| 8 | Load Ref Output At Shift Register |
| 9 | Transmit (one bit of ref code) |
| A | Gap Set Mistie |
| D | Occurrence of Last Shot |
| 1X | Beeper On With Status Displayed as to Code 0, 1, . . . 9, A, D, alone. |
| 53 | Step Roll Switch Up With Beep on and Code "3" |
| 93 | Step Roll Switch Down With Beep on and Code "3". |

Explanation of Table I: status code "0" occurs any time that the controller 20 is powered up to cue the operator that all input data at the encoders 26 must then be set. Sequencing start button 59 terminates the cueing operation; status code "D" indicates that the last shot position is at hand and thus, the truck location and connection station vis-a-vis the array must be changed; status codes "3", "4", "5" and "53" and "93" indicate certain roll switch activities. If there are errors in the programmed exploration activity, warning codes are also generated by the status codes "1"; and "7".]

OPERATIONAL SEQUENCE

Assume the operator has initially calibrated the start-up positions of the array and source with the surveyed locations. As previously indicated in regard to FIG. 4, this entails encoding of positional data via encoders 26 in conjunction with proper setting of the switching arrays 54, 55. The result: corresponding shot, spread and associated data appear at the displays 27 due to the interaction of data relationship established through operation of the microcomputer 25 of FIG. 2. In order to better understand how the present invention uses all data, perhaps a brief overview of the hardware aspects of the microprocessor 30 is in order and is presented below in connection with FIG. 5.

It should be initially noted that MPU 30 is preferably an Intel 8085 microprocessor, a product of Intel Incorp., Cupertino, Calif. As is well known, it has a microprocessor and controller integrated into a single chip. It also includes an array of registers 82 tied to an ALU 83 via an internal data bus 84 controlled via control unit 85. Program counter 86 and instructional register 87 have dedicated uses; the other registers, such as accumulator 88, have more general uses. In the 8085, expanded control functions result because the low-eight (8) address bits have the capability of being multiplexed. Such operation occurs at the beginning of each instructional cycle; the low-eight address lines appear via ALE line 89 for control of different elements of the location, including encoders 26; displays 27, printer 36 and synchronization link circuit 35, all operationally connected through I/O interface array 34.

SEQUENTIAL OPERATIONS

The foregoing operations, of course, assume that the arrays 13 and 13' of FIG. 1 and associated sources 16 and 16' are being operated in coordinate fashion.

For this purpose, a synchronization positional code must be generated within the master truck 11 for transfer and testing within the slave truck 11'. For this purpose the microcomputer system 25 of the master truck executes a series of steps which finally result in a transfer of the positional code to (and its subsequent testing within) the slave truck. Result: the source-sensor arrays of both trucks can be coordinately advanced in the direction of arrow 18 of FIG. 1.

Since the reception and testing of the generated positional reference code (at the slave truck) is an important element in the coordination of operations, a brief description of how such code is tested is in order and is provided below in association with FIG. 6. Note that the testing procedure of FIG. 6 is carried out using a microcomputer system identical to that depicted in FIG. 3 with the interrupt request (from the master truck) entering the former via its synchronization link circuit and thence to its interrupt controller.

As shown in FIG. 6 in more detail, assume that the interrupt request has been accepted and the positional code, usually a 16-bit code, has been received, and is being held in storage.

After resetting the interrupt at step 100, and decrementing a bit counter at step 101, each bit of the code undergoes sequential testing at decisional stages 102 and 103.

At stage 102, the length of each bit pulse is tested against an absolute standard, say a pulse of 50 milliseconds duration. If the bit is not valid, the code counter is reset at step 103*a*, an error display is activated at 104 and an audio alarm is triggered at 105. The master truck can then be contacted so that the positional code can be re-transmitted and testing begun anew.

If the bit is valid, stage 103 is entered, and the process repeated via loop 106 (if the tested bit is not the last bit). Otherwise, the bit counter contents (in storage) is loaded out to a selected storage/display device of the microcomputer system (at step 107) and displayed at step 108, for operator perusal. If the displayed contents are correct, then operations at the slave truck can be initiated, in coordination with steps being undertaken simultaneously at the master truck.

In general, the positional code identifies one of a series of next-in-time positions to be assumed by the source-detector array (associated with the slave truck) during subsequent data collection.

The selected position is usually—by custom—the end position of the array of the slave truck closest to array positions associated with the master truck.

It should be understood that the invention is not only directed to the specific embodiment set forth above, but that many variations are readily apparent to those skilled in the art, so thus the invention is to be given the broadest possible interpretation within the terms of the following claims.

What is claimed is:

1. Method of automatically testing a reference positional code that can be associated with one of a series of next-in-time positions of a source-detector array of a second recording truck ("slave"), said code being generated by a first recording truck ("master") in operatively connection with said second truck and tested within said second truck using a microcomputer system that includes a MPU, memory units and a series of displays/storage and switching devices interconnected via a system bus, comprising (a) detecting at said microcomputer system an interrupt request from said first truck,
    (b) storing the positional code generated by the first truck, and
    (c) sequentially testing the validity of the code on a bit-by-bit basis, whereby operations between trucks can be coordinated during subsequent collection operations.

2. Method of claim 1 with the additional step of displaying the validized positional code for operator perusal, at said second truck.

3. Method of claim 1, with the additional step of utilizing the validized positional code to initiate operations at said truck in cooperation with steps being simultaneously undertaken at said first truck.

4. Method of automatically testing a reference positional code at a second truck after generation by a first truck in operative connection therewith, said code being identified with one of a series of next-in-time positions of a source-detector array associated with said second truck, and is both generated and received by like microcomputer systems in said first and second trucks, comprising (a) storing at said microcomputer system of said second truck, said code in a counter thereof,
    (b) decrementing said counter, bit-by-bit, and validizing each bit based on a selected characteristic thereof,
    (c) if a bit is not valid, resetting said counter to zero, and alerting the operator to that fact,
    (d) if all bits are valid, displaying said code for operator perusal and comment.

5. Method of claim 7 with the additional step of resetting said storage counter to zero to await arrival of a new positional code from said first truck.

6. Method of claim 4 in which said code is a 16-bit code.

7. A ground position controller for automatically testing a reference positional code that can be associated with one of a series of next-in-time positions of a source-detector array of a second recording truck ("slave"), said code being generated by a first recording truck ("master") in operatively connection with said ground position controller in said second truck, said controller including a microcomputer system that includes a MPU, memory units and a series of displays/storage and switching devices interconnected via a system bus, said MPU including counter means for separately storing said positional code and then allowing validizing of each bit thereof based on a selected characteristic, whereby operations between said trucks can be coordinated.

8. Controller of claim 7 in which said series of display/storage and switching devices includes separate display means for a validized positional code whereby an operator can peruse same, so as to aid in coordination of operations between said trucks.

9. Controller of claim 7 in which said counter means is a 16-bit counter.

* * * * *